United States Patent
Osugi et al.

(10) Patent No.: US 8,506,828 B1
(45) Date of Patent: Aug. 13, 2013

(54) METHOD AND SYSTEM FOR PROVIDING A MAGNETIC RECORDING TRANSDUCER USING AN ION BEAM SCAN POLISHING PLANARIZATION

(75) Inventors: Masahiro Osugi, Fremont, CA (US); Guanghong Luo, Fremont, CA (US); Ronghui Zhou, Fremont, CA (US); Danning Yang, Fremont, CA (US); Dujiang Wan, Fremont, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 105 days.

(21) Appl. No.: 13/171,242

(22) Filed: Jun. 28, 2011

(51) Int. Cl.
*B44C 1/22* (2006.01)
(52) U.S. Cl.
USPC .......... 216/22; 216/41; 216/66; 438/708; 29/603.13
(58) Field of Classification Search
USPC .......... 216/22, 23, 41, 47, 66, 67, 24, 88; 438/708, 709; 29/603.13, 14
See application file for complete search history.

(56) References Cited

U.S. PATENT DOCUMENTS

| | | | |
|---|---|---|---|
| 4,025,411 A | 5/1977 | Hom-Ma et al. | |
| 4,671,970 A | 6/1987 | Keiser et al. | |
| 4,867,838 A | 9/1989 | Brooks et al. | |
| 6,387,810 B2 | 5/2002 | Beardsley | |
| 6,440,638 B2 | 8/2002 | Golz et al. | |
| 6,586,162 B2 | 7/2003 | Lee | |
| 6,803,316 B2 | 10/2004 | Hudson et al. | |
| 8,011,084 B2* | 9/2011 | Le et al. | 29/603.16 |
| 2006/0113496 A1* | 6/2006 | Yoshioka | 250/492.21 |
| 2007/0139816 A1* | 6/2007 | Chen et al. | 360/110 |

* cited by examiner

*Primary Examiner* — Lan Vinh

(57) ABSTRACT

A method and system for fabricating a read sensor on a substrate for a read transducer is described. A read sensor stack is deposited on the substrate. A mask is provided on the on the read sensor stack. The mask has a pattern that covers a first portion of the read sensor stack corresponding to the read sensor, covers a second portion of the read sensor stack distal from the read sensor, and exposes a third portion of the read sensor stack between the first and second portions. The read sensor is defined from the read sensor stack. A hard bias layer is deposited. An aperture free mask layer including multiple thicknesses is provided. A focused ion beam scan (FIBS) polishing step is performed on the mask and hard bias layers to remove a portion of the mask and hard bias layers based on the thicknesses.

11 Claims, 7 Drawing Sheets

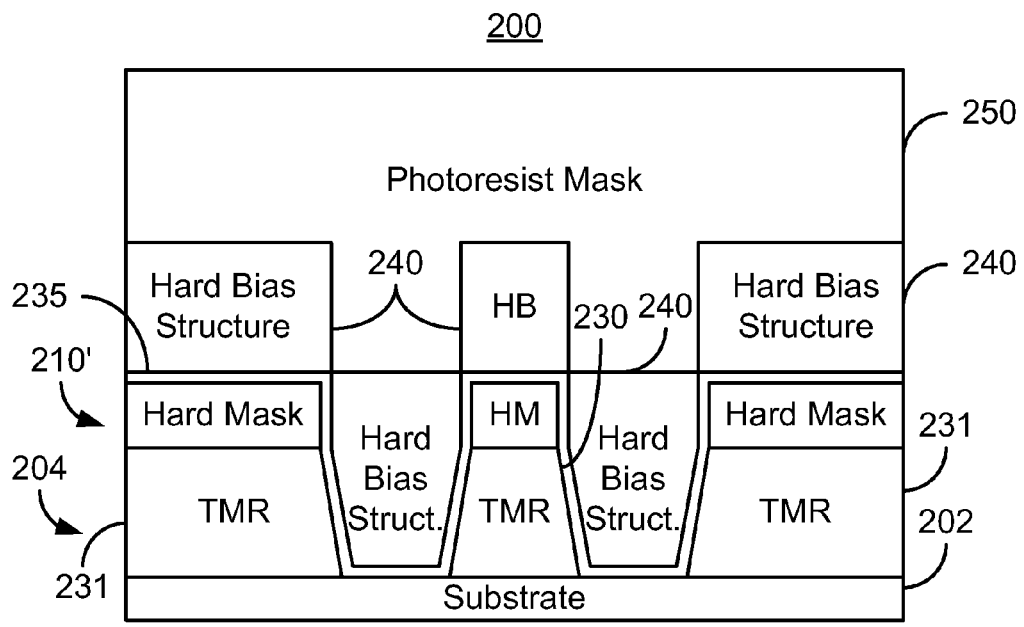
FIG. 11
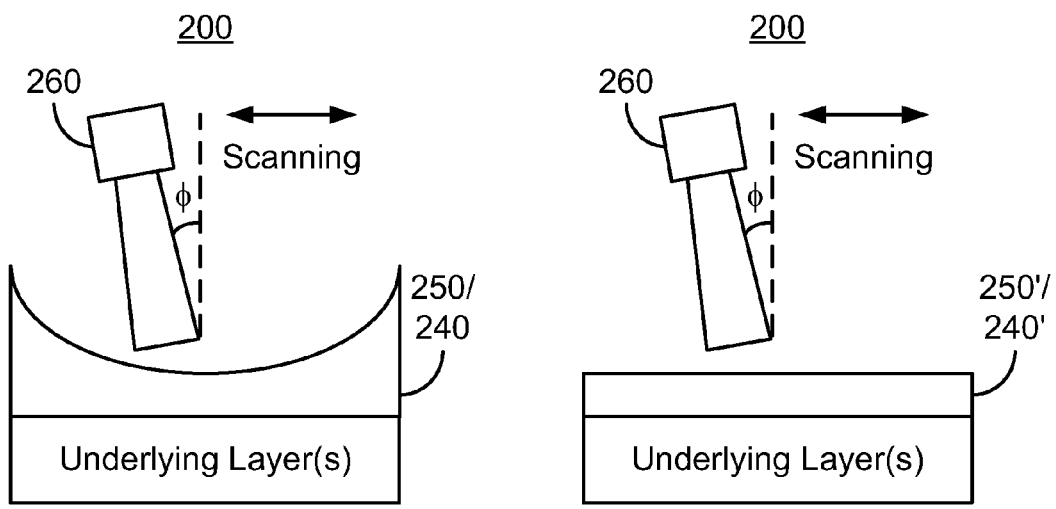
FIG. 12
FIG. 13

METHOD AND SYSTEM FOR PROVIDING A MAGNETIC RECORDING TRANSDUCER USING AN ION BEAM SCAN POLISHING PLANARIZATION

BACKGROUND

FIG. 1 depicts a conventional method 10 for fabricating a magnetoresistive sensor in magnetic recording technology applications. The method 10 typically commences after a conventional magnetoresistive or tunneling magnetoresistive (TMR) stack has been deposited. The conventional read sensor stack typically includes an antiferromagnetic (AFM) layer, a pinned layer, a nonmagnetic spacer layer, and a free layer. In addition, seed and/or capping layers may be used. The conventional magnetoresistive stack resides on an underlayer, which may be a substrate.

The conventional method 10 commences by providing a conventional hard mask layer and a photoresist mask, via step 12. The conventional hard mask layer is typically a material such as SiC or diamond-like carbon (DLC). The conventional photoresist mask has the desired pattern, which is transferred to the conventional hard mask layer. The conventional photoresist mask covers the region from which the conventional magnetoresistive sensor is to be formed, as well as a portion of the transducer distal from the sensor. However, part of the device region adjoining the magnetoresistive sensor is left uncovered.

A conventional hard mask is defined from the conventional hard mask layer, via step 14. Step 14 includes transferring the pattern from the conventional photoresist mask, for example through a reactive ion etch (RIE). The photoresist mask may also be removed in step 14.

The magnetoresistive structure is defined, via step 16. Step 16 typically includes ion milling the transducer. Thus, the exposed portion of the magnetoresistive stack is removed. The magnetoresistive structure being defined may be a magnetoresistive sensor for a read transducer.

The hard bias material(s), such as CoPt, are deposited, via step 18. In addition, seed and/or capping layers may be provided in step 18. The hard bias material(s) and other layers are deposited while the conventional hard mask is in place. In addition, a shallow mill may be performed as part of providing the hard bias structure. A capping layer may be deposited after the shallow ion mill is completed. The capping layer typically includes a noble metal such as Ru, Ta, and/or Rh.

A chemical mechanical planarization (CMP) is performed, via step 20. This CMP aids in removing the hard bias materials above the hard mask and planarizes the top surface of the transducer. The hard mask may then be removed, for example via a reactive ion etch (RIE), via step 22. An additional planarization is performed, via step 24. The stripe height of the sensor is then defined, via step 26. Note that in some instances, the stripe height may be defined in step 26 prior to the steps 12-24 used at least in part to define the magnetoresistive sensor.

FIG. 2 depicts a conventional transducer 50 fabricated using the conventional method 10. For clarity, FIG. 2 is not to scale. A TMR sensor 54 residing on a substrate 52 is shown. Also shown are hard bias 56 and 58. The TMR junction 54 has a track width of w and inboard and outboard junction angles, $\alpha$ and $\beta$. The inboard junction angle, $\alpha$, is closer to the center of the substrate on which the junction 54 is fabricated than the outboard junction angle $\beta$.

Although the conventional method 10 allows the conventional transducer 50 to be fabricated, there are several drawbacks. It is typically difficult to control the CMP performed in step 20. Thus, some portion of the hard bias materials 56 and 58 may be depleted of certain constituents, such as Co. It is also difficult to polish the desired amount hard bias materials above the small areas, such as the TMR sensor 54, while removing a sufficient amount of the hard bias materials in wider areas, such as the test area guide (not shown). Conversely it is difficult to remove the desired amount of the hard bias materials from wider regions without overpolishing narrower areas. Further, the slurry used for the CMP performed in step 20 may result in corrosion of underlying metal layers, particularly Co depleted hard bias materials 56 and 58.

Accordingly, what is needed is a system and method for improving the fabrication of a magnetic recording read transducer.

BRIEF SUMMARY OF THE INVENTION

A method and system for fabricating a read sensor on a substrate for a read transducer is described. A read sensor stack including a plurality of layers is deposited on the substrate. A mask is provided on the on the read sensor stack. The mask has a pattern that covers a first portion of the read sensor stack corresponding to the read sensor, covers a second portion of the read sensor stack distal from the read sensor, and exposes a third portion of the read sensor stack between the first and second portions of the read sensor stack. The read sensor is defined from the read sensor stack. Defining the read sensor includes removing the third portion of the read sensor stack. A hard bias layer is deposited. A mask layer including a plurality of thicknesses is provided. The mask layer is aperture free. A focused ion beam scan (FIBS) polishing step is performed on the mask layer and the hard bias layer to remove a portion of the mask layer and a portion of the hard bias layer based on the plurality of thicknesses.

BRIEF DESCRIPTION OF SEVERAL VIEWS OF THE DRAWINGS

FIGS. 6-15 depict an exemplary embodiment of a magnetic recording transducer during fabrication.

DETAILED DESCRIPTION OF THE PREFERRED EMBODIMENTS

Figure 1:
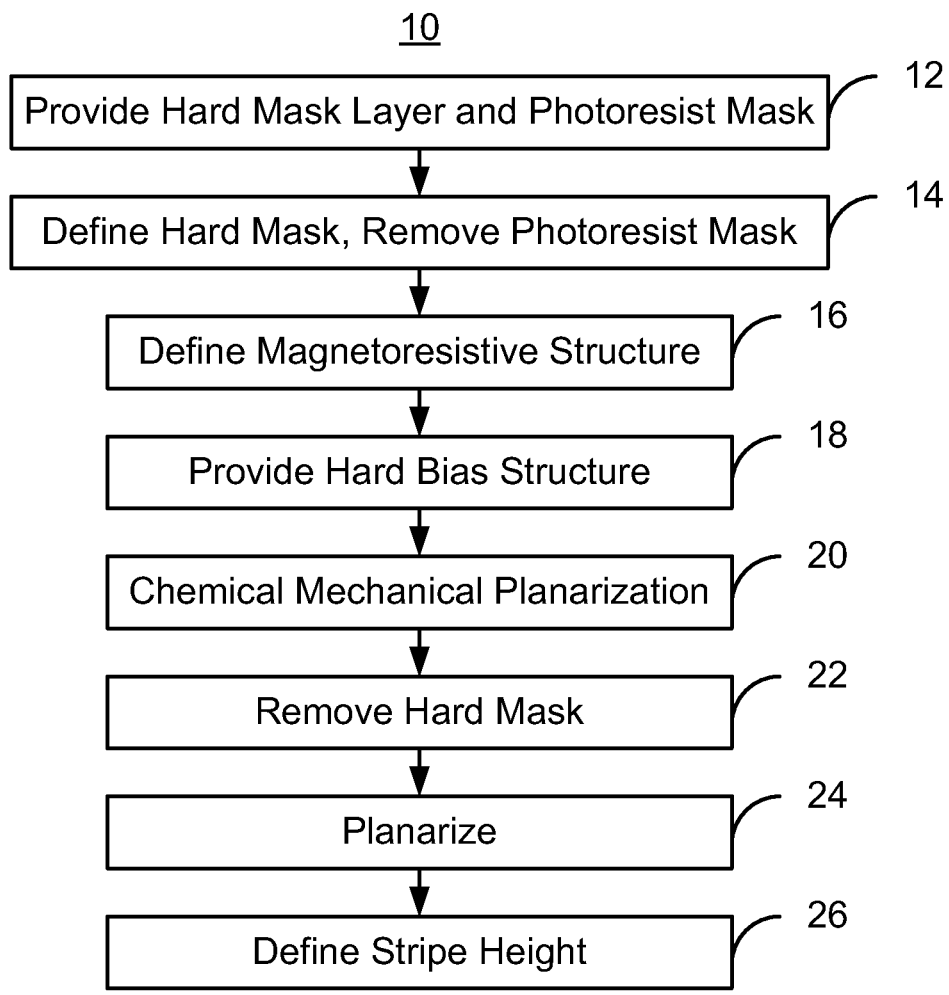
FIG. 1 is a flow chart depicting a conventional method for fabricating a read sensor for magnetic recording transducer.
Figure 2:
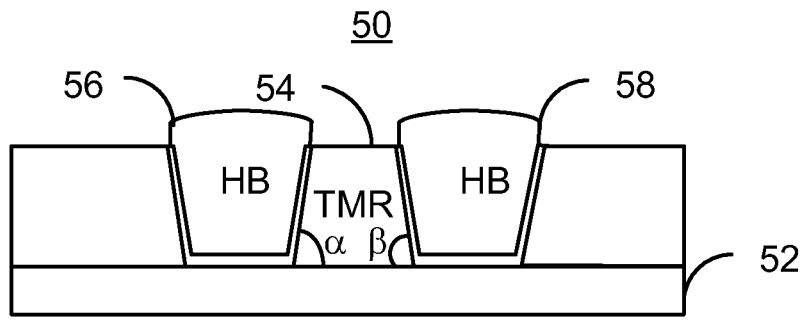
FIG. 2 depicts an ABS view of a conventional magnetic recording transducer.
Figure 3:
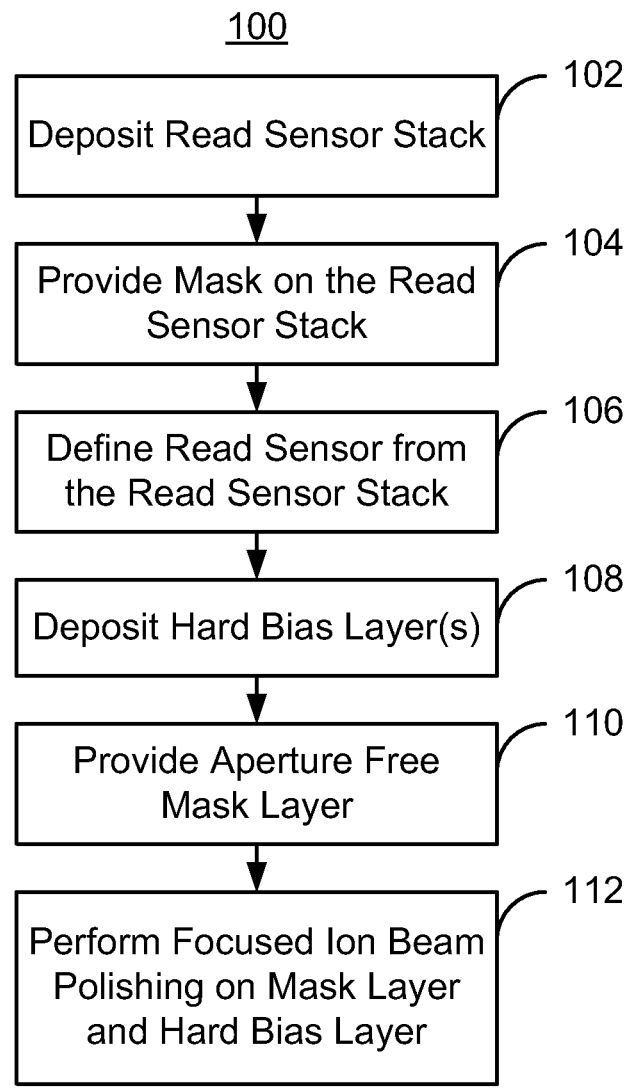
FIG. 3 depicts an exemplary embodiment of a method for fabricating a read sensor for a magnetic recording transducer.

FIG. 3 is an exemplary embodiment of a method 100 for providing magnetic recording transducer. For simplicity, some steps may be omitted. The method 100 is also described in the context of providing a single recording transducer. However, the method 100 may be used to fabricate multiple transducers at substantially the same time. The method 100 is also described in the context of particular layers. A particular layer may include multiple materials and/or multiple sublayers. The method 100 also may start after formation of other portions of the magnetic recording transducer. For example, the method 100 may start after layers underlying the magnetoresistive sensor, such as a tunneling magnetoresistive (TMR) sensor have been fabricated.

A read sensor stack is deposited on the substrate, via step 102. The magnetoresistive layers may include a pinning layer, a pinned layer, a nonmagnetic spacer layer, and a free layer. In addition, seed and/or capping layers may be used. The pinning layer may be an AFM or other layer configured to fix, or pin, the magnetization of the pinned layer. The pinned layer may be a synthetic antiferromagnetic (SAF) layer including magnetically coupled ferromagnetic layers separated by a nonmagnetic layer. The ferromagnetic layers may be termed pinned and reference sub-layers. The nonmagnetic spacer layer may be a conductive layer for a giant magnetoresistive structure, an insulator for a TMR structure, or may have another structure. The free layer is ferromagnetic and has a magnetization that is free to change in response to an external magnetic field, for example from a media. The free layer may have multiple sub-layers, as may the pinned and reference sub-layers. Further, the transducer may be considered to have a device region, in which the magnetoresistive structure is to be formed, and a field region distal from the magnetoresistive structure.

A mask is provided on the read sensor stack, via step 104. The mask has a pattern that covers a first portion of the read sensor stack corresponding to the read sensor. A second portion of the read sensor stack distal from the read sensor is covered, while a third portion of the read sensor stack between the first portion and the second portion of the read sensor stack is exposed. In some embodiments, the mask is a hard mask. Step 104 may thus include depositing a hard mask layer, such as one or more of SiC and diamond-like carbon (DLC). A photoresist mask may then be provided on the hard mask layer. The pattern of the photoresist mask is then transferred to the hard mask layer, forming the mask.

The read sensor is defined from the read sensor stack, via step 106. The third, exposed portion of the read sensor stack is thus removed. Step 106 may include performing an ion mill. In addition, an insulating layer may also be deposited as part of step 106. For example, an aluminum oxide layer may be provided.

At least one hard bias layer is deposited, via step 108. Hard bias material(s) include those materials having a sufficiently high coercivity that normal operation of the magnetoresistive structure does not alter the magnetization (and thus the bias) of the hard bias materials. A portion of the hard bias material(s) is substantially adjacent to the magnetoresistive structure in the track width direction. If the magnetoresistive structure is to be used in a current-perpendicular-to-plane (CPP) configuration, then an insulating layer may be deposited prior to the hard bias materials, for example as part of step 106. In addition, seed and/or capping layers may also be provided in step 108. The seed and/or capping layer(s) may each include sub-layers. For example, the capping layer may be a bilayer including a Ta sub-layer and a Ru sub-layer on the Ta sub-layer. In another embodiment, the capping layer(s) may be a trilayer including a Ru sub-layer sandwiched by two Ta sub-layers. A shallow ion mill may also be performed in step 108.

A mask layer having multiple thicknesses is provided, via step 110. The mask layer is aperture free at least in the device region. Step 110 may include spinning on a layer of photoresist. The top of the mask layer may thus have a substantially flat top surface even though the thickness of the layer varies. However, the photoresist layer is not patterned using photolithography. As a result, the photoresist layer is aperture free. Further, the thickness of the photoresist mask layer may be large. For example, in some embodiments, the mask layer may be at least one micron thick. However, in other embodiments, materials other than photoresist may be used for the mask.

A focused ion beam scan (FIBS) polishing of the mask layer and the hard bias layer is performed, via step 112. Using the FIBS polishing, a portion of the mask layer and a portion of the hard bias layer are removed based on the thicknesses of the mask layer. The FIBS polishing scans across the desired portion of the substrate while an ion beam polishing is being performed. The amount of polishing may depend upon the thickness of the mask or other layer(s). In some embodiments, the step of FIBS polishing the mask and hard bias layers includes measuring the thickness of the mask layer across the substrate. In some embodiments, the step of measuring the thickness of the mask layers may include performing the measurements for every wafer being processed. In other embodiments, the measurement may be performed for only some wafers. For example, one wafer per batch or other analogous set of wafers may be performed. In some embodiments, step 112 includes scanning across the substrate while ion polishing such that the ion polishing removes a greater amount of the mask layer and/or the hard bias layer for a greater thickness. In some embodiments, multiple passes, or scans, are performed for some or all of the substrate. In some embodiments, the ion polishing is performed for a longer time for the greater thickness of the plurality of thicknesses. Both the hard bias and mask layers are removed. Thus, in some embodiments, the ion beam polishing is performed such that the ion beam is oriented at an angle from normal to the surface of the transducer. The angle is selected so that the removal rate for the mask layer is substantially equal to the removal rate for the hard bias layer. Thus, the hard bias and mask layers are removed in a similar manner. The FIBS polishing may be terminated based on end-point detection. The FIBS polishing may thus be terminated well within the hard bias structure. Thus, it can be ensured that the FIBS polishing does not remove any portion of the magnetoresistive stack.

Fabrication of the transducer may then be completed. For example, a remaining portion of the mask layer, as well as the mask, may be removed.

Figure 4:
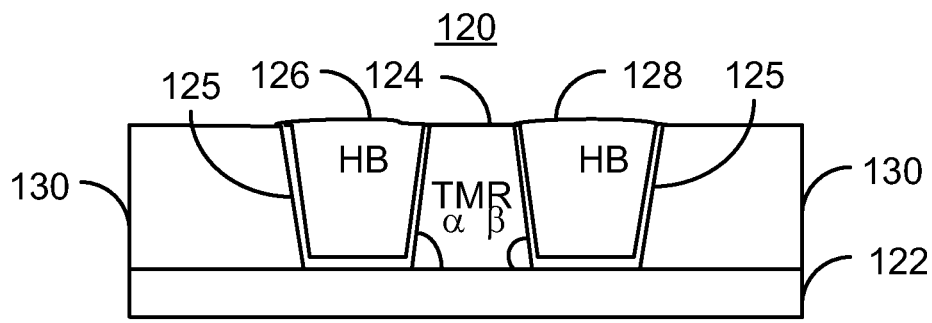
FIG. 4 depicts an ABS view of an exemplary embodiment of a magnetic recording read transducer.

FIG. 4 depicts the transducer 120 after the method 100 is completed. For clarity, FIG. 4 is not to scale. In addition, only a portion of the transducer 120 is shown. The transducer is also described in the context of particular layers and structures. However, sublayers and/or substructures may also be provided. The magnetoresistive sensor 124 and hard bias structures 126 and 128 are shown as residing on underlying layers 122. The regions 130 and 132 may be formed of materials used in the read sensor stack or may be other layers. For example, nonmagnetic and/or insulating layers may be used. An insulating layer 125 is shown. In other embodiments, the insulating layer 125 might be omitted.

Using the method 100, the transducer 120 having a magnetoresistive read sensor 124 may be formed. Fabrication of the hard bias structures 126 and 128 may be improved. The FIBS polishing step aids in even and more complete removal of excess portions of the hard bias structures 126 and 128. This may be completed without a CMP that tends to result in Co depletion and corrosion of structures. Thus, the transducer 120 is less subject to subsequent damage. Performance of the transducer 120 and manufacturing yield using the method 100 may be enhanced.

Figure 5:
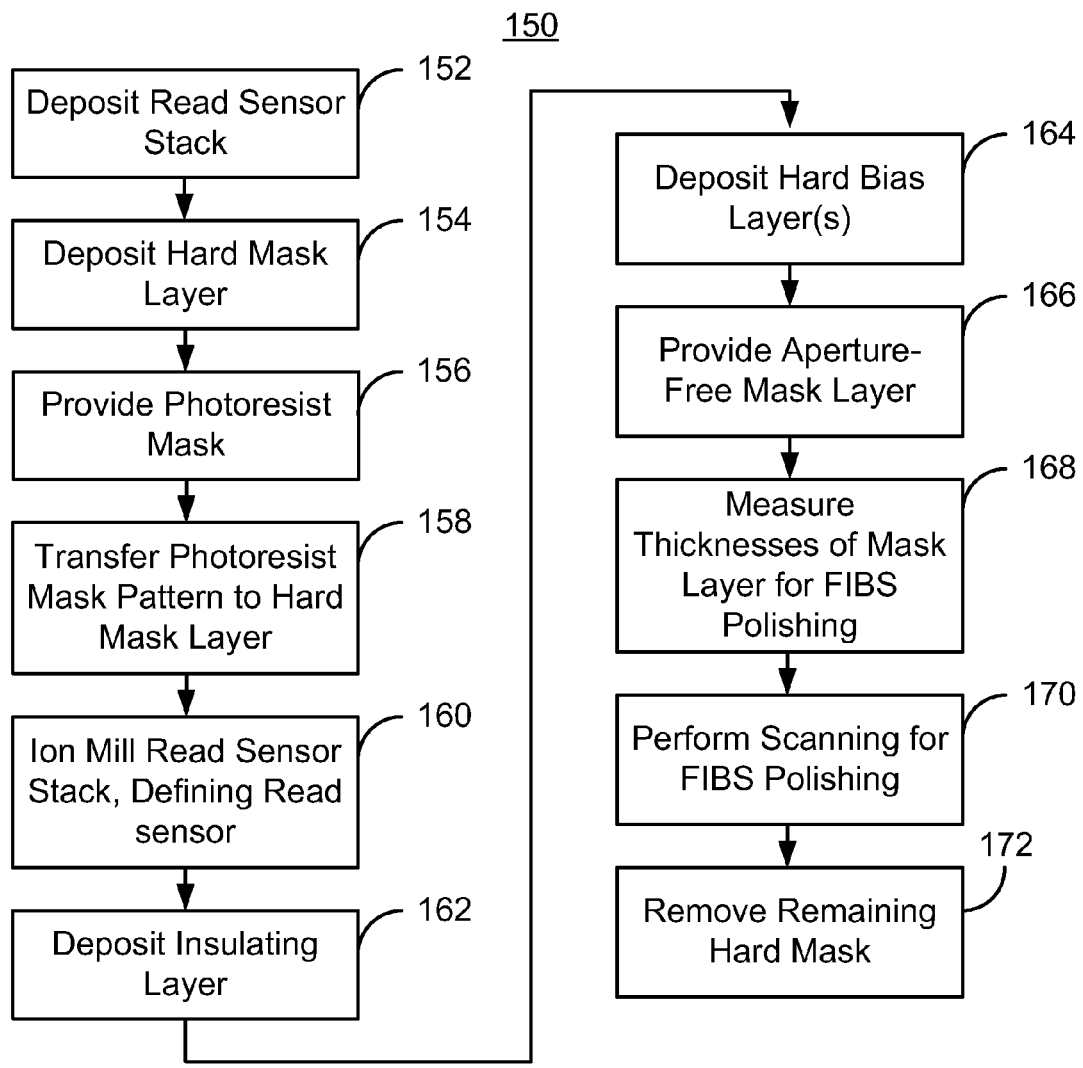
FIG. 5 is a flow chart depicting an exemplary embodiment of a method for fabricating a magnetic recording read transducer.

FIG. 5 is a flow chart depicting another exemplary embodiment of a method 150 for fabricating a magnetic recording transducer. FIGS. 6-15 depict another exemplary embodiment of a magnetic recording transducer 200 during fabrication. For clarity, FIGS. 6-15 are not to scale. The method 150 is described in the context of the transducer 200. For simplicity, some steps of the method 150 may be omitted. The method 150 is also described in the context of providing a single recording transducer 200. However, the method 150 may be used to fabricate multiple transducers at substantially the same time. The method 150 and transducer 200 are also described in the context of particular layers. A particular layer may include multiple materials and/or multiple sub-layers. The method 150 also may start after formation of other portions of the magnetic recording transducer 200. Further, the transducer may be considered to have a device region, in which the magnetoresistive structure is to be formed, and a field region distal from the magnetoresistive structure.

A stack for the read sensor is deposited, via step 152. The magnetoresistive layers may include a pinning layer, a pinned layer, a nonmagnetic spacer layer, and a free layer. In addition, seed and/or capping layers may be used. Examples of such layers are described above.

A hard mask layer is provided on the read sensor stack, via step 4. Step 154 includes blanket depositing a hard mask layer such as SiC, amorphous carbon (e.g. sputtered carbon), and/or DLC on the read sensor stack. For the purposes of describing the method 150, it is assumed that an SiC layer is used. In some embodiments, the step 154 includes depositing a hard mask layer having a thickness of not more than seventy nanometers. In another embodiment, the hard mask layer provided in step 154 has a thickness of not more than sixty nanometers. However, in other embodiments, other thicknesses of the hard mask layer may be used.

A photoresist mask is provided, via step 156. The photoresist mask has a pattern that is desired to be transferred to the underling layers. Step 156 includes spinning on or otherwise covering at least the relevant areas of the transducer 200 with a layer of photoresist. Photolithography may then be used to form the desired pattern in the photoresist layer. The photoresist mask covers regions corresponding to the sensor portion and line frame.

Figure 6:
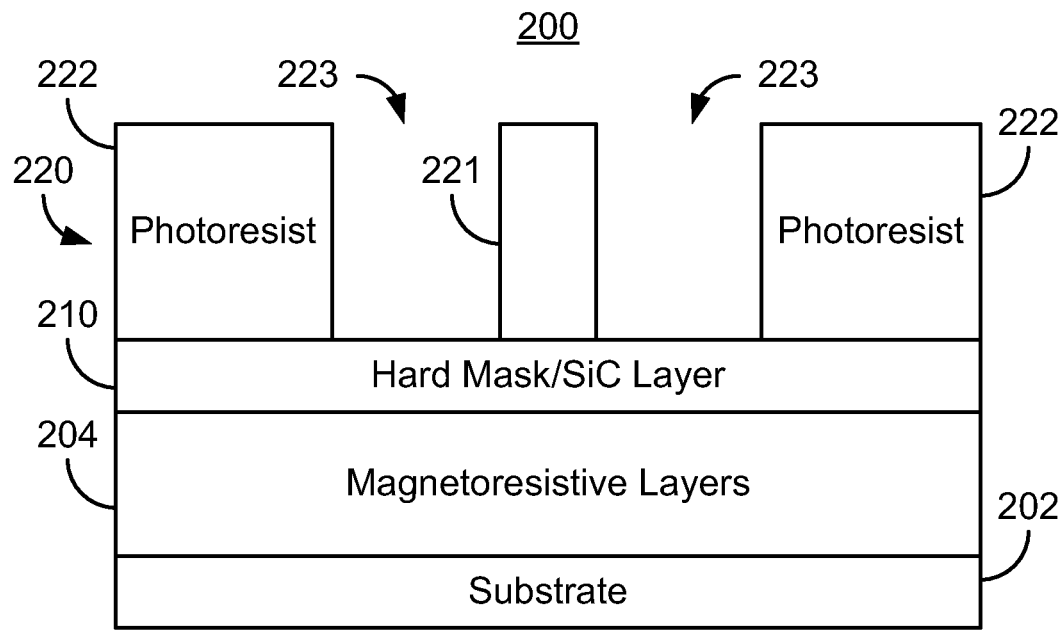

FIG. 6 depicts an ABS view of the transducer 200 after step 156 is performed. Thus, a substrate 202 and read sensor stack 204 are shown. The substrate 202 may include underlying layers such as shield or insulating gap layers. In addition, the hard mask layer 210 is shown as being blanket deposited on the read sensor stack 204. Further, the photoresist mask 220 is shown. The photoresist mask 220 has portions 221 and 222 corresponding to the read sensor and the frame, respectively. The portion 221 corresponding to the magnetoresistive sensor may be printed with a critical dimension at the limit of the photo process used for the photoresist mask 220. However, the width of the frame 222 may be larger. The photoresist mask 222 also includes apertures 223 uncovering portions of the hard mask layer 210.

Figure 7:
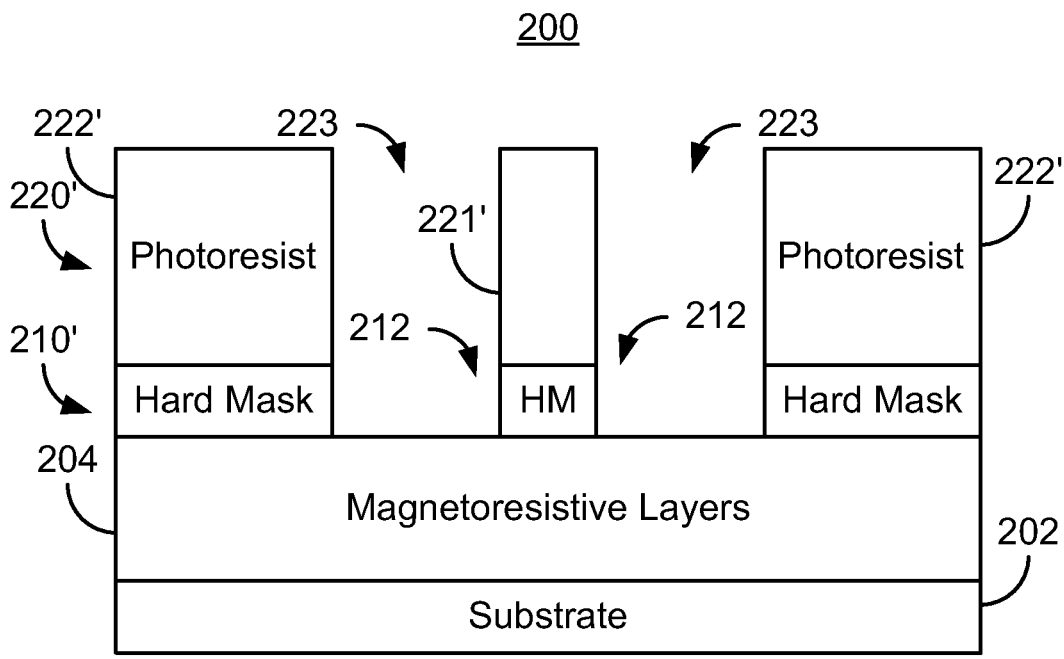
Figure 8:
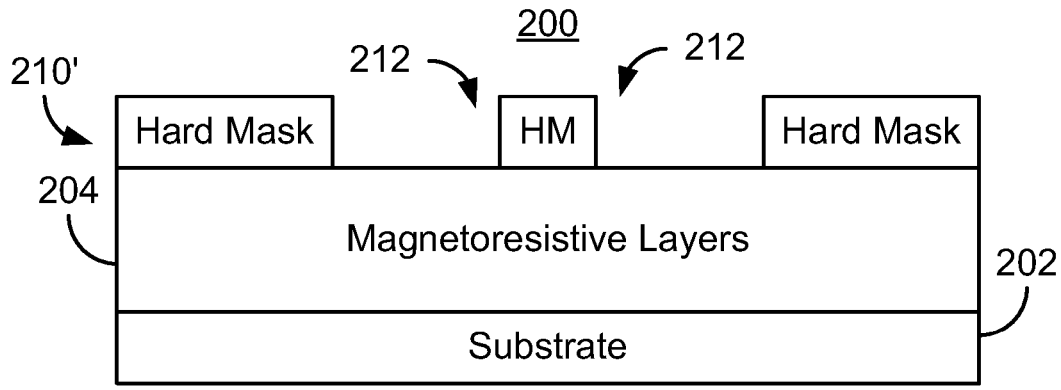

The pattern of the photoresist mask 220 is transferred to the hard mask layer 210, via step 158. In some embodiments, step 158 may include performing RIE(s) appropriate for the material(s) used for the hard mask layer 210. For example, in some embodiments a SiC RIE might be used. In addition, the remaining photoresist 220 is stripped. FIG. 7 depicts the transducer 200 after the pattern has been transferred, but before the photoresist mask 220 has been stripped. Thus, the pattern of the photoresist mask 220' has been transferred to hard mask layer 210'. Thus, the hard mask layer 210' has apertures 212 that expose a region of the read sensor stack 204 between the sensor region (covered by photoresist mask 221) and regions distal from the sensor (covered by photoresist mask 222). It is expected that the dimensions of the portions 221' and 222' of the photoresist mask 220' change during step 158. FIG. 8 depicts the transducer 200 after the photoresist mask 220 has been removed. Thus, the hard mask 210' covers portions of the read stack layers 204.

Figure 9:
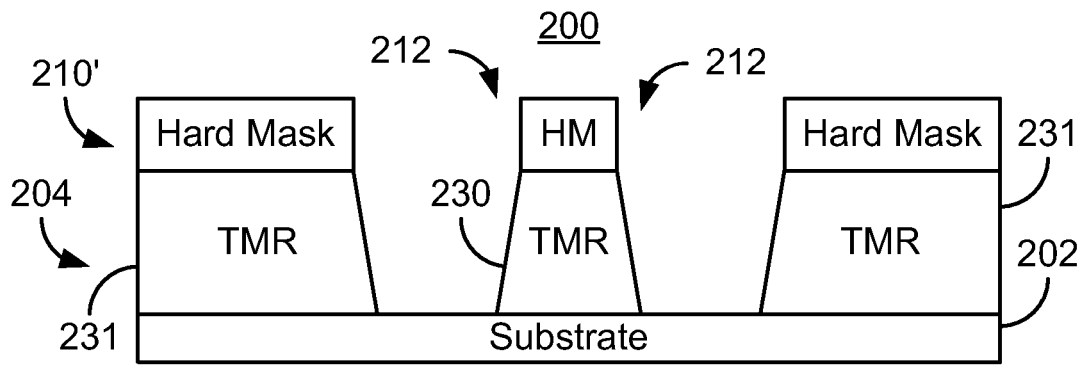

The read sensor is defined from the read sensor stack using ion milling, via step 160. Thus, the third portion of the read sensor stack exposed by apertures 212 is removed. FIG. 9 depicts the transducer 200 after step 160 is performed. Thus, a magnetoresistive read sensor 230 has been defined. In some embodiments, portions 231 of the read sensor stack 204 distal from the sensor 230 are also defined from the read sensor stack 204.

An insulating layer is deposited on the read sensor, via step 162. In some embodiments, step 162 includes depositing a layer of aluminum oxide. The insulating layer is optionally provided if the magnetoresistive structure is to be used in a CPP configuration.

Figure 10:
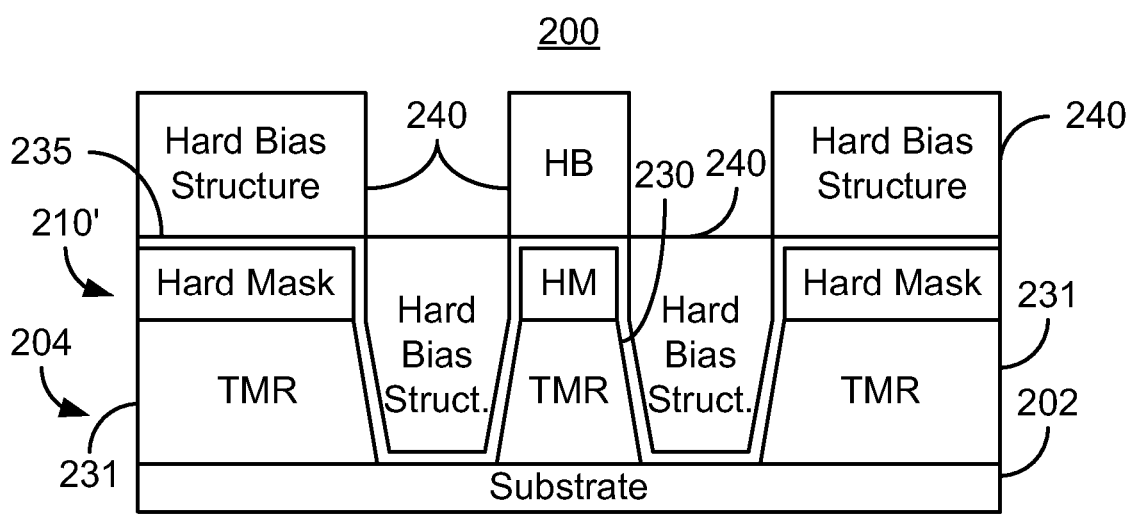

Hard bias layer(s) are deposited after the insulating layer is provided, via step 164. A first portion of the hard bias material(s) is substantially adjacent to the magnetoresistive structure in the track width direction. In some embodiments, capping layer(s) for the hard bias material(s) is also provided in step 164. Such a capping layer may have sub-layer(s). For example, the capping layer may be a bilayer of Ta and Ru. In another embodiment, the capping layer may be a trilayer including a first Ta sub-layer, a Ru sub-layer, and a second Ta sub-layer. In such an embodiment, the Ru sub-layer resides between the Ta sub-layers. FIG. 10 depicts the transducer 200 after step 164 is performed. Thus, optional insulating layer 235 and hard bias layer(s) 240 are shown. For simplicity, seed and/or capping layers, if any, are not shown.

A photoresist mask layer is provided, via step 166. Thus, in some embodiments, the mask layer consists of photoresist. Because photoresist is used, the top of the mask layer may have a substantially flat top surface. However, the thickness of the mask layer varies. The photoresist layer is not patterned using photolithography. As a result, the photoresist layer is aperture free. Further, the thickness of the photoresist mask layer may be large. For example, in some embodiments, the mask layer may be at least one micron thick. FIG. 11 depicts the transducer 200 after step 166 is performed. As a result, photoresist mask 250 is shown.

In steps 168 and 170, a FIBS polishing is performed. Thus, steps 168 and 170 correspond to step 112 of the method 100. The thicknesses of the mask layer 250 are measured across the substrate, via step 168. Step 168 may be performed for each substrate, or only for sample substrates. The FIBS polishing is performed by scanning across the substrate while the ion beam polishes the transducer at a polishing angle, via step 170. The ion beam scanning and polishing in step 170 may be performed for a longer time to achieve a greater polishing in certain areas. In these areas a greater amount of the mask layer 250 and/or the hard bias layer 240 is removed because these areas correspond to greater thicknesses of the mask 250. The polishing angle corresponds to substantially equal removal rates for the layers 240 and 250. Although the thickness measurement might not be performed for all substrates, the scan and removal of step 170 is.

Figure 14:
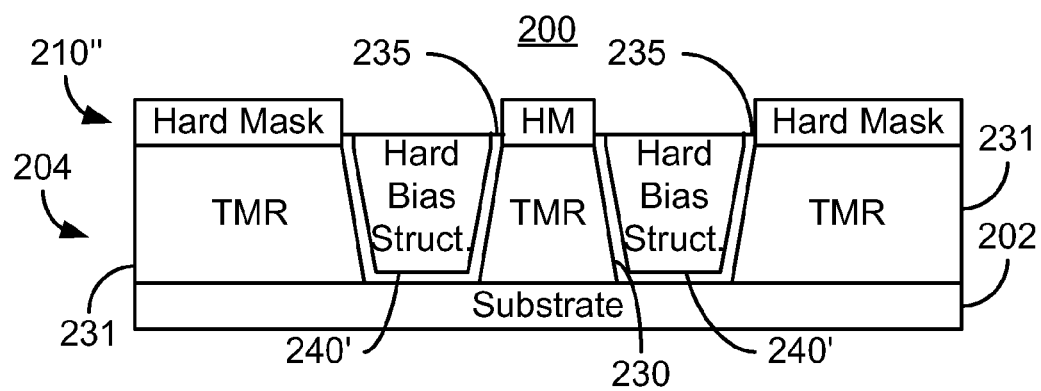

FIGS. 12-13 depict the transducer 200 during step 170. The ion beam is tilted at a desired polishing angle, φ, such that removal rate of all desired constituents is substantially equal. FIG. 12 depicts the variations in height. In contrast, FIG. 13 depicts the transducer 200 after step 170 is completed for a region shown. Thus, the top surface is thinned and substantially flat. FIG. 14 depicts an ABS view of the transducer 200 after step 170 is performed. Thus, the mask 250 and a portion of the hard mask 210 and hard bias 240 have been removed. Further, the variations in height of the hard bias 240' and hard mask 210" has been reduced.

Figure 15:
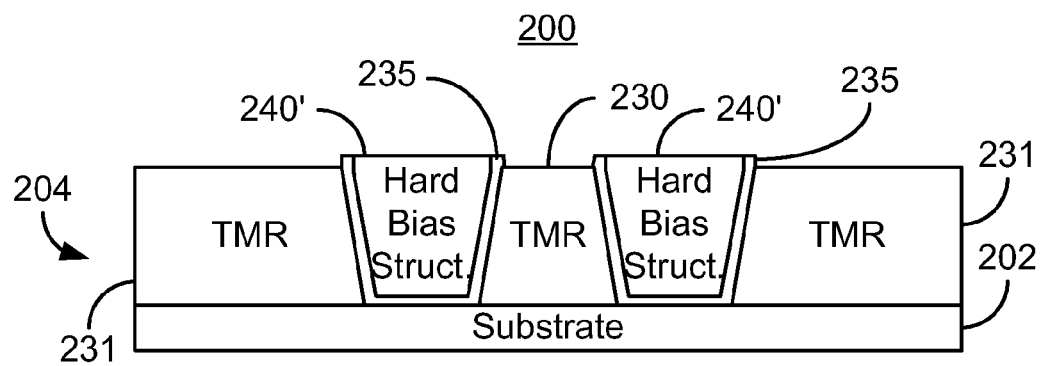

A remaining portion of the hard mask 210' is removed after the step of performing the FIBS polishing, via step 172. In some embodiments, step 172 includes performing an SiC RIE to remove the hard mask 210". FIG. 15 depicts the transducer 200 after step 172 is performed. Thus, the magnetoresistive structure 230 has been exposed. Fabrication of the transducer 200 may then be completed.

Using the method 150, the transducer 200 having a magnetoresistive read sensor 230 may be formed. Fabrication of the hard bias structures 240' may be improved. The FIBS polishing step aids in even and more complete removal of excess portions of the hard bias structures 240'. This may be completed without a CMP that tends to result in Co depletion and corrosion of structures. Thus, the transducer 200 is less subject to subsequent damage. Performance of the transducer 200 and manufacturing yield using the method 100 may be enhanced.

We claim:

1. A method for fabricating a read sensor on a substrate for a read transducer, the method comprising:
    depositing a read sensor stack including a plurality of layers on the substrate;
    providing a mask on the on the read sensor stack, the mask having a pattern, the pattern covering a first portion of the read sensor stack corresponding to the read sensor, covering a second portion of the read sensor stack distal from the read sensor, and exposing a third portion of the read sensor stack between the first portion and the second portion of the read sensor stack;
    defining the read sensor from the read sensor stack, the defining the read sensor including removing the third portion of the read sensor stack;
    depositing a hard bias layer;
    providing a mask layer including a plurality thicknesses, the mask layer being aperture free;
    focused ion beam scan (FIBS) polishing the mask layer and the hard bias layer to remove a portion of the mask layer and a portion of the hard bias layer based on the plurality of thicknesses, the step of polishing the mask layer and the hard bias layer further including:
        performing the ion polishing at a polishing angle such that a first removal rate for the mask layer is substantially equal to a second removal rate for the portion of the hard bias layer.

2. The method of claim 1 wherein the mask layer has a substantially flat top surface.

3. The method of claim 1 further comprising:
    depositing an insulating layer on the read sensor before the step of depositing the hard bias layer.

4. The method of claim 1 wherein the step of providing the mask further includes:
    depositing a hard mask layer;
    providing a photoresist mask having a photoresist mask pattern on the hard mask layer; and
    transferring the photoresist mask pattern to the hard mask layer, forming a hard mask having the pattern.

5. The method of claim 1 further comprising:
    removing a remaining portion of the mask after the step of performing the FIBS polishing.

6. The method of claim 1 wherein the mask layer includes photoresist.

7. The method of claim 1 wherein the step of performing the FIBS polishing further includes:
    measuring at least a portion of the plurality of thicknesses across the substrate;
    scanning across the substrate while ion polishing such that the ion polishing removes a greater amount of at least one of the mask layer and the hard bias layer for a greater thickness of the plurality of thicknesses.

8. The method of claim 7 wherein the step of scanning further includes:
    making multiple passes across at least a portion of the substrate.

9. The method of claim 7 wherein the step of scanning further includes:
    performing the ion polishing for a longer time for the greater thickness of the plurality of thicknesses.

10. A method for fabricating a read sensor on a substrate for a read transducer, the method comprising:
    depositing a read sensor stack including a plurality of layers on the substrate;
    depositing a hard mask layer on the read sensor stack;
    providing a photoresist mask having a photoresist mask pattern on the hard mask layer;
    transferring the photoresist mask pattern to the hard mask layer, forming a hard mask having a pattern, the pattern covering a first portion of the read sensor stack corresponding to the read sensor, covering a second portion of the read sensor stack distal from the read sensor, and exposing a third portion of the read sensor stack between the first portion and the second portion of the read sensor stack; ion milling the read sensor stack, thereby removing the third portion of the read sensor stack and defining the read sensor from the read sensor stack;
    depositing an insulating layer on the read sensor;
    depositing a hard bias layer after the step of depositing the insulating layer;
    providing a mask layer including a substantially flat top surface and a plurality of thicknesses, the mask layer consisting of photoresist and being aperture free;
    focused ion beam scan (FIBS) polishing the mask layer and the hard bias layer to remove a portion of the mask layer and a portion of the hard bias layer based on the plurality of thicknesses, the step of performing the FIBS polishing further including
        measuring at least a portion of the plurality of polishing across the substrate;
        scanning across the substrate while ion polishing at a polishing angle, the ion polishing being performed for a longer time for a greater polishing of the plurality of polishing such that a greater amount of at least one of the mask layer and the hard bias layer is removed for the greater polishing of the plurality of polishing, the polishing angle corresponding to a first removal rate for the mask layer and a second removal rate for the hard bias layer, the first removal rate being is substantially equal to the second removal rate; and
    removing a remaining portion of the hard mask after the step of performing the FIBS polishing.

11. The method of claim 10 wherein the step of scanning further includes:
    making multiple passes across at least a portion of the substrate.

* * * * *